US012236671B2

(12) United States Patent
Popov et al.

(10) Patent No.: US 12,236,671 B2
(45) Date of Patent: Feb. 25, 2025

(54) DAMAGE DETECTION APPARATUS AND METHOD

(71) Applicant: Ocado Innovation Limited, Hatfield (GB)

(72) Inventors: Ivaylo Popov, Hatfield (GB); Georgi Pachov, Hatfield (GB); Tom Clancy, Hatfield (GB)

(73) Assignee: OCADO INNOVATION LIMITED, Hatfield (GB)

( * ) Notice: Subject to any disclaimer, the term of this patent is extended or adjusted under 35 U.S.C. 154(b) by 352 days.

(21) Appl. No.: 17/624,312

(22) PCT Filed: Jun. 30, 2020

(86) PCT No.: PCT/EP2020/068332
§ 371 (c)(1),
(2) Date: Dec. 31, 2021

(87) PCT Pub. No.: WO2021/001337
PCT Pub. Date: Jan. 7, 2021

(65) Prior Publication Data
US 2022/0358753 A1 Nov. 10, 2022

(30) Foreign Application Priority Data

Jul. 3, 2019 (GB) .................................. 1909578

(51) Int. Cl.
*G06V 10/77* (2022.01)
*G06V 10/778* (2022.01)
*G07C 5/00* (2006.01)

(52) U.S. Cl.
CPC ........ *G06V 10/7715* (2022.01); *G06V 10/778* (2022.01); *G07C 5/006* (2013.01)

(58) Field of Classification Search
CPC .. G06V 10/7715; G06V 10/778; G07C 5/006; G07C 5/085; G06Q 10/20; G06N 20/00
See application file for complete search history.

(56) References Cited

U.S. PATENT DOCUMENTS 8,510,196 B1 8/2013 Brandmaier et al.
8,712,893 B1 4/2014 Brandmaier et al.
(Continued)

FOREIGN PATENT DOCUMENTS

CN 106127747 A 11/2016
CN 106504248 A 3/2017
(Continued)

OTHER PUBLICATIONS

International Search Report (PCT/ISA/210) and Written Opinion (PCT/ISA/237) mailed on Aug. 10, 2020, by the European Patent Office as the International Searching Authority for International Application No. PCT/EP2020/068332. (12 pages).
(Continued)

*Primary Examiner* — Aaron W Carter
*Assistant Examiner* — Kathleen M Broughton
(74) *Attorney, Agent, or Firm* — Buchanan Ingersoll & Rooney, PC

(57) ABSTRACT

The present disclosure provides an apparatus and method to automatically detect vehicle damage which minimises the time taken to detect damage per vehicle. For example, the action of damage detection is also performed with an action of causing the fixing of any detected damage, where appropriate. A damage detection unit is configured and arranged to detect damage on a vehicle. The damage detection unit includes a receiving unit arranged to receive an image from a camera and a determining unit arranged to determine damage on the vehicle based on the received image. Moreover, the damage detection unit includes a storing unit (Continued)

arranged to store information about damage previously determined to be present on the vehicle and a comparing unit arranged to compare the damage determined by the determining unit with the information about previous damage as stored by the storing unit.

20 Claims, 6 Drawing Sheets

(56) References Cited

U.S. PATENT DOCUMENTS

| | | | |
|---|---|---|---|
| 9,036,038 | B2 | 5/2015 | Kimura |
| 9,560,266 | B2 | 1/2017 | Kimura |
| 10,086,782 | B1 | 10/2018 | Konrardy et al. |
| 10,102,586 | B1 | 10/2018 | Marlow et al. |
| 10,319,094 | B1 | 6/2019 | Chen et al. |
| 2007/0061109 | A1 | 3/2007 | Wilke et al. |
| 2011/0234854 | A1 | 9/2011 | Kimura |
| 2012/0076437 | A1* | 3/2012 | King ............... G06Q 40/08 382/286 |
| 2012/0083959 | A1 | 4/2012 | Dolgov et al. |
| 2014/0316825 | A1 | 10/2014 | van Dijk et al. |
| 2015/0032580 | A1 | 1/2015 | Altermatt et al. |
| 2015/0207986 | A1 | 7/2015 | Kimura |
| 2015/0294419 | A1 | 10/2015 | Gonzalez Miranda et al. |
| 2016/0144787 | A1 | 5/2016 | Saward et al. |
| 2016/0239922 | A1 | 8/2016 | Jimenez |
| 2017/0148102 | A1* | 5/2017 | Franke ............... G06Q 30/0601 |
| 2017/0270612 | A1* | 9/2017 | Howe ............... G06V 20/176 |
| 2017/0293894 | A1 | 10/2017 | Taliwal et al. |
| 2017/0293895 | A1 | 10/2017 | Song |
| 2018/0082379 | A1 | 3/2018 | Kelsh et al. |
| 2018/0260793 | A1* | 9/2018 | Li ............... G06Q 40/08 |
| 2018/0260886 | A1 | 9/2018 | Buttolo et al. |
| 2018/0293664 | A1 | 10/2018 | Zhang et al. |
| 2018/0293806 | A1 | 10/2018 | Zhang et al. |
| 2018/0300576 | A1 | 10/2018 | Dalyac et al. |
| 2018/0322472 | A1* | 11/2018 | Russell ............... G06Q 30/0645 |
| 2018/0342113 | A1 | 11/2018 | Kislovskiy et al. |
| 2019/0073641 | A1 | 3/2019 | Utke |
| 2019/0095877 | A1 | 3/2019 | Li |
| 2019/0147583 | A1 | 5/2019 | Stefan |
| 2019/0189007 | A1* | 6/2019 | Herman ............... G08G 1/0133 |
| 2020/0034958 | A1 | 1/2020 | Campbell et al. |

FOREIGN PATENT DOCUMENTS

| | | |
|---|---|---|
| CN | 107392218 A | 11/2017 |
| CN | 107813775 A | 3/2018 |
| CN | 109163914 A | 1/2019 |
| CN | 109344819 A | 2/2019 |
| CN | 109766740 A | 5/2019 |
| CN | 109934086 A | 6/2019 |
| EP | 3200139 A1 | 8/2017 |
| JP | 2004199236 A | 7/2004 |
| JP | 2011211438 A | 10/2011 |
| JP | 2018537798 A | 12/2018 |
| KR | 20140024486 A | 3/2014 |
| WO | 2018039560 A1 | 3/2018 |
| WO | 2018055340 A1 | 3/2018 |
| WO | 2018175999 A1 | 9/2018 |
| WO | 2018191421 A1 | 10/2018 |

OTHER PUBLICATIONS

Office Action (Examination report No. 1 for your standard patent application) issued Nov. 30, 2022, by the Australian Government, IP Australia in corresponding Australian Patent Application No. 2020299967. (5 pages).

Office Action (Examination Report No. 2) issued on Apr. 3, 2023, by the Australian Patent Office in corresponding Australian Patent Application No. 2020299967. (6 pages).

Office Action (Examination Report No. 4) issued on Oct. 24, 2023, by the Australian Patent Office in corresponding Australian Patent Application No. 2020299967. (5 pages).

Office Action issued on Mar. 14, 2023, by the Japanese Patent Office in corresponding Japanese Patent Application No. 2021-577579, and an English Translation of the Office Action. (9 pages).

Office Action issued on May 31, 2023, by the Great Britain Patent Office in corresponding Great Britain Application No. GB2305697. 1. (4 pages).

Dwivedi, "Ultimate Guide: Building a Mask R-CNN Model for Detecting Car Damage (with Python codes)", [retrieved from Wayback Machine on Jul. 24, 2023], <URL:https://web.archive.org/web/20181218171511/https://www.analyticsvidhya.com/blog/2018/07/buildingmask-r-cnn-model-detecting-damage-cars-python/>.

Li et al, "An Anti-fraud System for Car Insurance Claim Based on Visual Evidence", arXiv.org, arXiv:1804.11207, published Apr. 30, 2018, [retrieved from internet on Jul. 24, 2023] .<URL: https://arxiv.org/pdf/1804.11207.pdf>.

Office Action (Examination Report No. 3) issued on Jul. 26, 2023, by the Australian Patent Office in corresponding Australian Patent Application No. 2020299967. (7 pages).

Office Action issued on Feb. 2, 2023, by the Canadian Patent Office in corresponding Canadian Patent Application No. 3,145,587. (4 pages).

Jayawardena, "Image Based Automatic Vehicle Damage Detection", A thesis submitted for the degree of Doctor of Philosophy at The Australian National University, Nov. 18, 2013, XP055197600. (199 pages).

Office Action issued on Dec. 28, 2023, by the Canadian Patent Office in corresponding Canadian Patent Application No. 3,145,587. (6 pages).

Office Action issued on Jan. 19, 2022, by the Great Britain Patent Office in corresponding Great Britain Patent Application No. GB2116420.7. (4 pages).

Office Action (Request for the Submission of an Opinion) issued on Apr. 1, 2024, by the Korean Patent Office in corresponding Korean Patent Application No. 10-2022-7001976, and an English Translation of the Office Action. (15 pages).

Office Action issued on Sep. 26, 2024, by the Chinese Patent Office in corresponding Chinese Patent Application No. 202080047856.8. (9 pages).

* cited by examiner

DAMAGE DETECTION APPARATUS AND METHOD

This application claims priority from UK Patent Application No. GB1909578.5 filed 3 Jul. 2019, the content of all this application hereby being incorporated by reference.

TECHNICAL FIELD

The present invention relates generally to the field of damage detection and more specifically to an apparatus and method for detecting damage on a vehicle.

BACKGROUND

Many companies use fleets of vehicles for specific tasks. For example, delivery vans are typically owned by a company who deliver goods to customers and/or other companies. Similarly, rental vehicle companies offer customers and/or other companies the ability to rent vehicles for a specific period of time. Managing and maintaining a fleet of vehicles for such companies is a challenge.

One particular detail that must be maintained is the mechanical and electrical condition of the vehicles. Companies managing a fleet of vehicles are required to keep the vehicle in an operable and damage-free condition. Moreover, where damage has been caused to a vehicle, the driver who caused the damage must be correctly attributed and the driver re-trained where appropriate.

Moreover, damage typically impedes the mechanical and electrical condition of the vehicle. For example, damage to tyre walls may cause premature tyre failure when the vehicle is in use rendering the vehicle inoperative. Such a failure would prevent the company using the vehicle to deliver goods and in the case of rental companies prevent the company renting the vehicle until the vehicle has been repaired.

Similarly, damage to lights (headlights, turning lights, brake lights) would similarly prevent companies operating such damaged vehicle due to the danger of collision with other vehicles (for example, at night) due to the damaged lights.

However, checking an entire fleet of vehicles after every use to ensure the mechanical and electrical state of vehicles is prohibitive due to the time taken per vehicle and the number of vehicles which need to be checked.

There is therefore a need to provide a system to permit the fast and accurate determination of mechanical and electrical damage to a vehicle and, where necessary, to correct such damage.

SUMMARY

In view of the problems described above, the present invention aims to provide an apparatus and method to automatically detect vehicle damage which minimises the time taken to detect damage per vehicle. Preferably, the action of damage detection is also performed with an action of causing the fixing of any detected damage, where appropriate.

In general terms, the invention introduces a vehicle damage detection unit arranged to detect damage on a vehicle based on images of the vehicle and to compare the detected damage to previous damage to ascertain whether new damage has occurred.

According to the present invention there is provided a damage detection unit arranged to detect damage on a vehicle. The damage detection unit comprises a receiving unit arranged to receive an image from a camera and a determining unit arranged to determine damage on the vehicle based on the received image. Moreover, the damage detection unit further comprises a storing unit arranged to store information about damage previously determined to be present on the vehicle and a comparing unit arranged to compare the damage determined by the determining unit with the information about previous damage as stored by the storing unit.

The present invention further provides a damage detection system, the system comprising a camera arranged to capture an image of a vehicle and a damage detection unit as previously described.

The present invention further provides a damage detection method for detecting damage on a vehicle. The method comprises the steps of receiving an image from a camera, determining damage on the vehicle based on the received image, retrieving information about damage previously determined to be present on the vehicle and comparing the damage determined by the determining step with the information about previous damage as retrieved by the retrieving step.

BRIEF DESCRIPTION OF THE DRAWINGS

Embodiments of the invention will now be described by way of example only with reference to the accompanying drawings, in which like reference numbers designate the same or corresponding parts, and in which.

DETAILED DESCRIPTION OF EMBODIMENTS

First Embodiment

Figure 1:
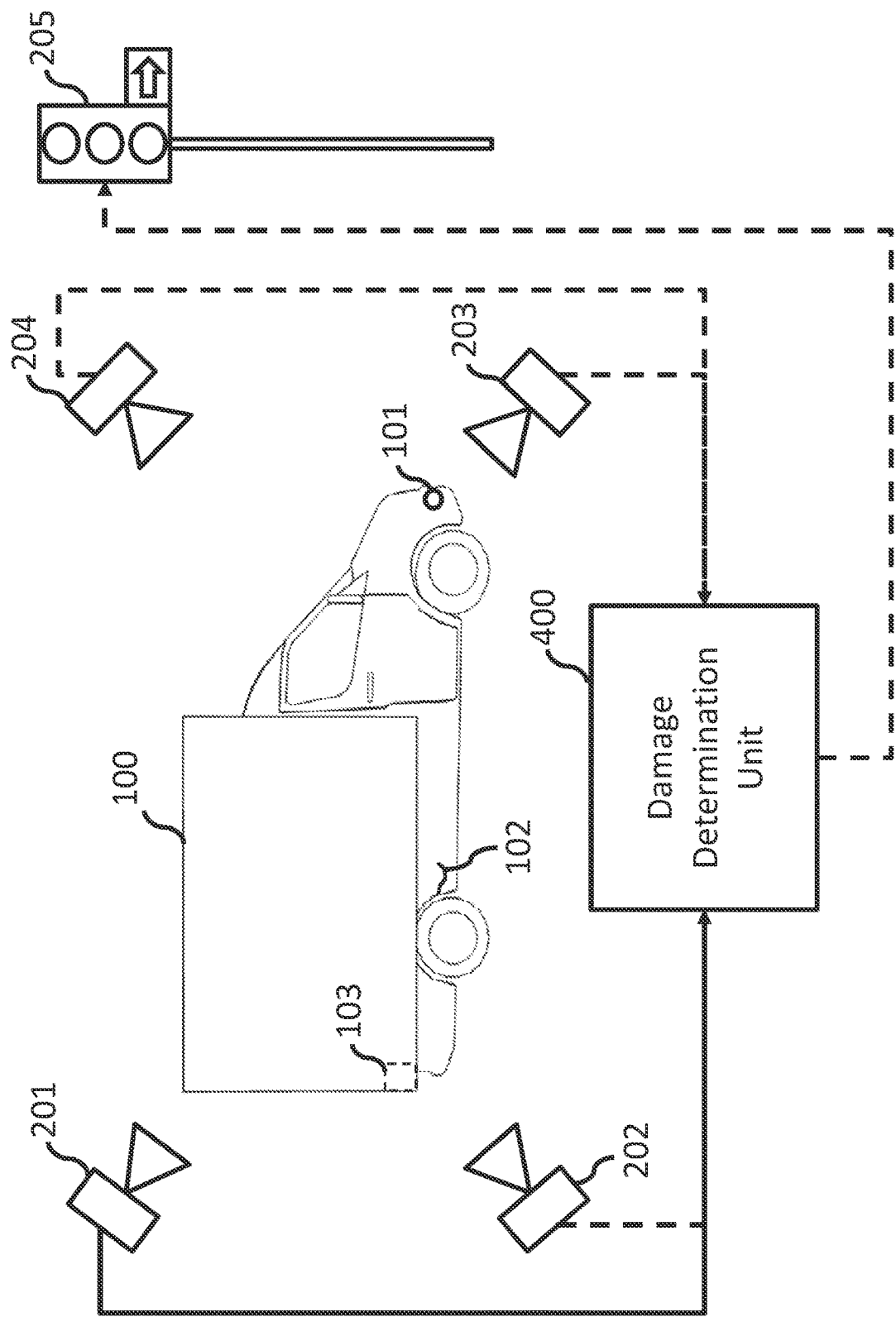
FIG. 1 depicts a schematic diagram of a damage detection unit according to a first embodiment of the present invention together with a camera and a directing unit.

FIG. 1 shows a damage determination unit 400 according to the first embodiment of the present invention. FIG. 1 also shows additional equipment which may be used in conjunction with the damage determination unit 400 of the first embodiment.

In particular, FIG. 1 shows cameras 201-204 arranged to image a vehicle 100. In FIG. 1, the vehicle 100 is shown with different types of damage such as denting 101, scratching 102 and missing parts 103. For example, the missing parts 103 may comprise missing mechanical or electrical components such as bumpers, headlights, turning signals, brake lights etc. Similarly, scratching 102 may comprise damage to vehicle tyres by way of scratching which may cause premature tyre failure. Denting may comprise damage to the bodywork of the vehicle from collisions.

Moreover, a directing unit 205 is shown which is arranged to indicate to the vehicle that it is to proceed along a normal route, for example, to be refuelled, refilled with goods or transferred to a new customer. In this example, the directing unit 205 is shown in the form of a traffic signal, however, other forms are envisaged.

Alternatively, the directing unit 205 may indicate that the vehicle 100 is to proceed to a workshop or other facility arranged to correct the damage present on the vehicle. In this regard, the damage determination unit 400 may be further arranged to automatically book the vehicle 100 for refurbishment at the workshop. Alternatively, the directing unit 205 may be arranged to instruct the vehicle 100 to return to the workshop at a future time. For example, the workshop may be currently full of vehicles being repaired. Therefore, by booking the vehicle 100 into the workshop at a future time, and instructing the vehicle 100 to return at that time, attention can be paid to the vehicle even when the workshop is currently full and the vehicle 100 does not require immediate repair. In this way, automated vehicle repair scheduling can be effected.

It is envisaged that where the vehicle 100 is a self-driving vehicle (for example, one which moves without the direct assistance of any driver/passenger) then the directing unit 205 may command the self-driving vehicle to proceed to a workshop to repair the damage determined by the damage determination unit 400. Therefore, the directing unit 205 is envisaged to be a unit arranged to command a self-driving vehicle.

Although four cameras 201-204 are depicted in FIG. 1, only one camera 201 is required for use with the damage determination unit 400. The other three cameras 202-204 are optional. Moreover, although four cameras 201-204 are shown it is envisaged that more than four cameras may be used to determine damage on the vehicle 100.

The cameras 201-204 may be arranged around the vehicle 100 to capture images of the vehicle 100 from different angles/positions. A camera may be further positioned to capture images of a specific area of the vehicle 100 which are most susceptible to damage.

The damage determination unit 400 is arranged to receive images of the vehicle 100 from the camera 201 (and optionally, from any of cameras 202-204) and is arranged to determine whether new damage has occurred on the vehicle 100 which has not been previously detected and/or to determine whether damage has worsened since last determination. Based on the determined damage, the damage determination unit 400 may be arranged to control the directing unit 205. The directing unit 205 may be controlled to have the vehicle 100 perform one of a number of behaviours. For example, the directing unit 205 may be arranged to instruct the vehicle to proceed without any remedial work to the detected damage. Alternatively, the vehicle 100 may be instructed to proceed to a workshop or the like at which the damage detected may be rectified.

Figure 2:
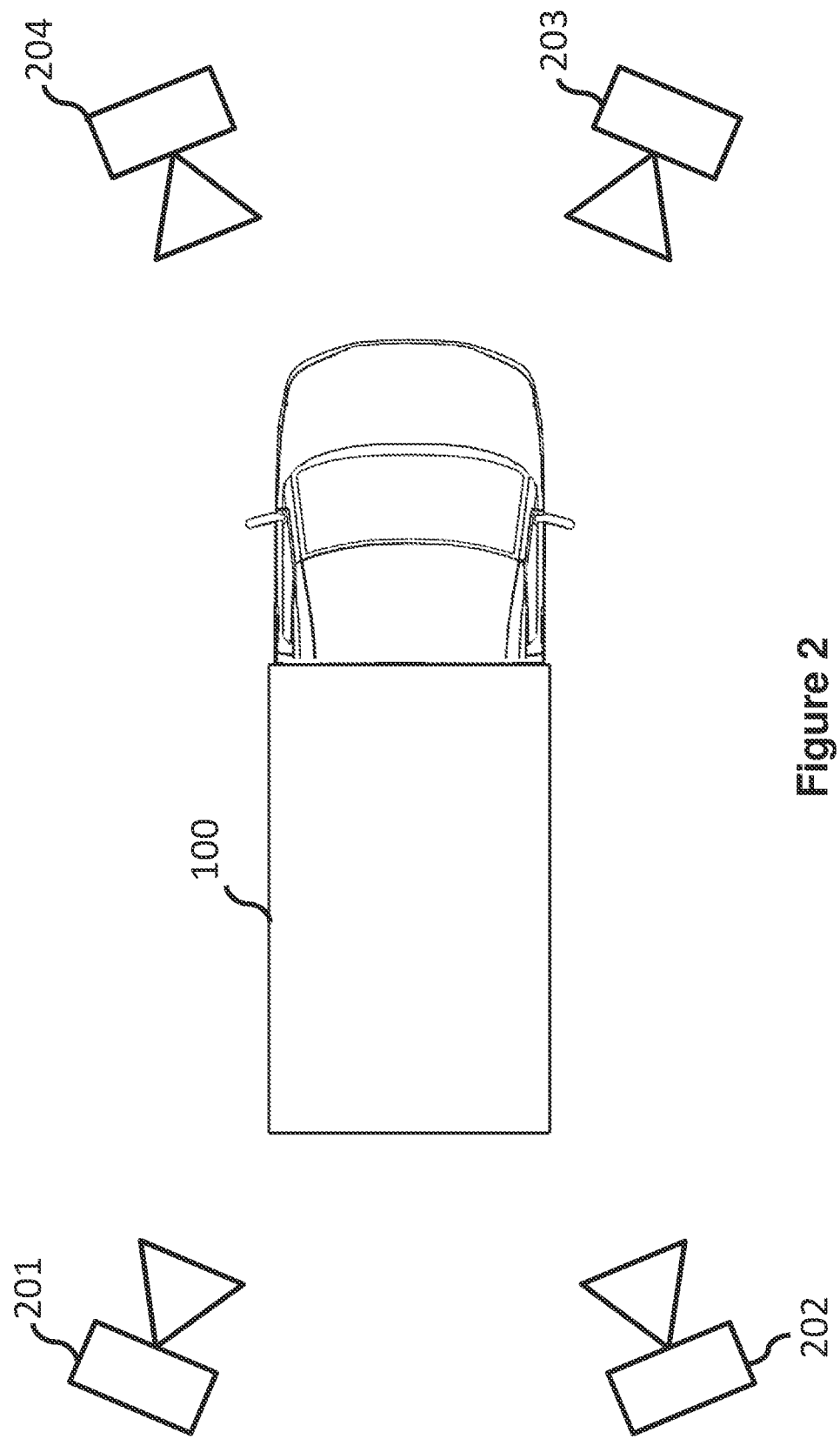
FIG. 2 depicts one potential layout of cameras arranged to image a vehicle.

FIG. 2 depicts one example of a layout of four camera 201-204 around a vehicle. It was found that by positioning a camera to primarily capture images of a corner of the vehicle 100 provided the most accurate determination of damage was made by the damage determination unit 400 because damage was found to most likely occur at the corners of the vehicle 100. Additional cameras may be used, for example, a camera may be further installed to capture images of the roof of the vehicle 100. Similarly, a camera may be included to capture images of the number plate/license plate of the vehicle 100. In this way, damage to specific areas of the vehicle 100 may be captured.

It was found that using a camera which captured a high quality image resulted in damage detection which was more accurate in the type of damage identified and the location at which it was identified. Moreover, a camera capturing a higher quality image was found to capture more instances of damage on the vehicle 100 than a lower quality image.

It was also found that using consistent lighting on the vehicle also improved the results. In other words, by illuminating the vehicle with lighting of a consistent nature resulted in more accurate damage detection even when performed at night, in adverse weather conditions and the like. In this way, an image captured by a camera had consistent lighting of the vehicle 100 no matter the time of day or time of year in which the image was captured.

It was also found that capturing a High Dynamic Range (HDR) image of the vehicle 100 further improved damage detection. In this regard, the camera 201 may be arranged to capture a plurality of images at a variety of exposure values. The plurality of images are combined into a single image which thereby features an enhanced dynamic range.

Figure 3:
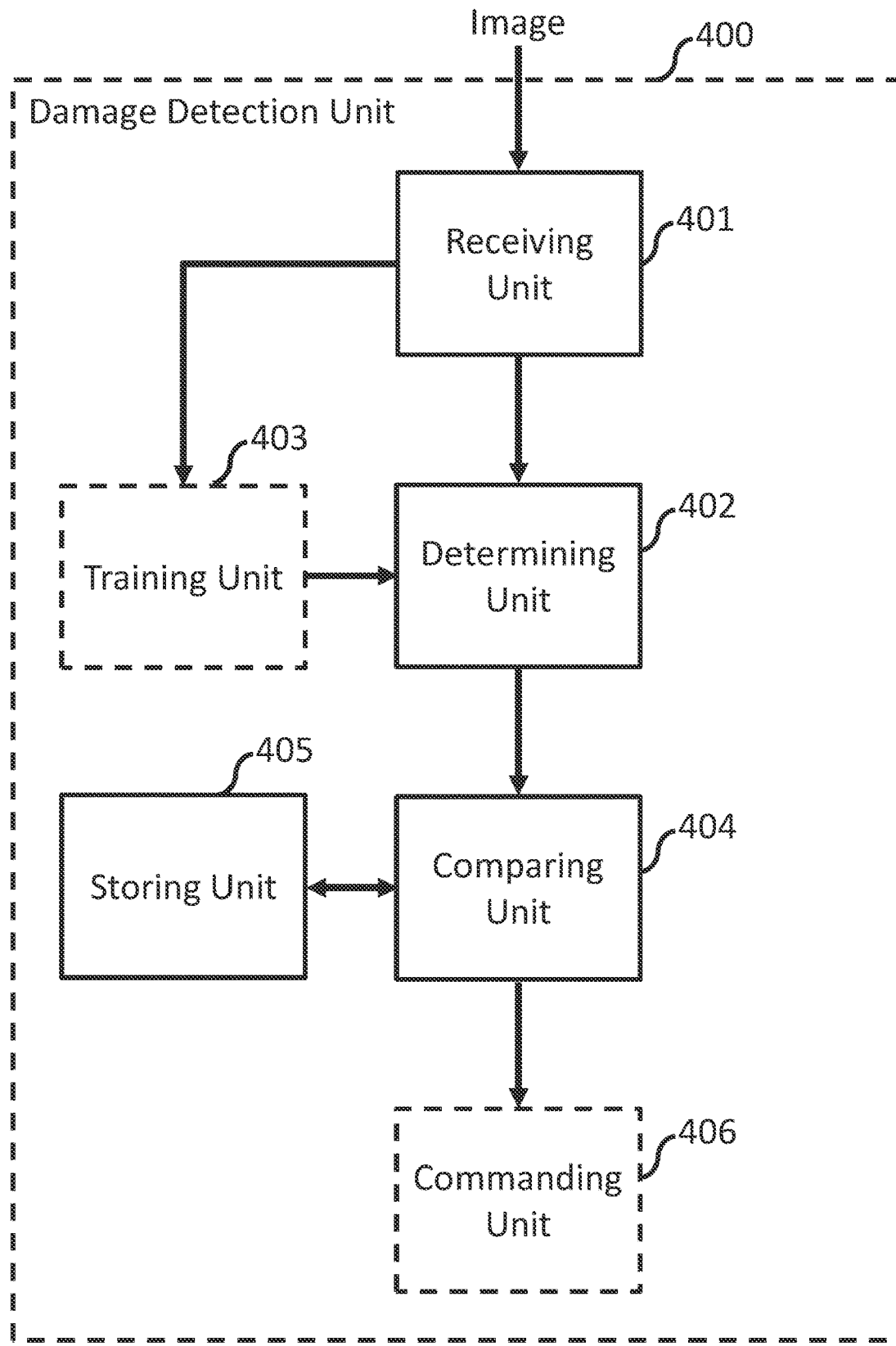
FIG. 3 depicts a schematic diagram of a damage detection unit according to a first embodiment of the present invention.

FIG. 3 depicts a damage detection unit 400 according to the first embodiment of the present invention. The damage determination unit 400 comprises a receiving unit 401, a determining unit 402, a storing unit 405 and a comparing unit 404. Optionally, the damage determination unit 400 may further comprise at least one of a training unit 403 and a commanding unit 406.

The receiving unit 401 is arranged to receive an image of the vehicle from the camera 201. Optionally, the receiving unit 401 may be further arranged to process the image so that all images processed by the determining unit 402 are of a similar composition. For example, the receiving unit 401 may be further arranged to crop the received image, adjust the brightness of the image, colour balance or remove the background of the image to thereby leave only the vehicle 100 in the image. In this way, consistent performance is achieved because the images do not substantially vary between captures.

As explained previously, the images captured by the camera 201 may be HDR images. Alternatively, the camera may capture a plurality of images taken at different exposure levels. In this case, the receiving unit 401 may be further arranged to combine the plurality of images to form a single image which exhibits high dynamic range.

Moreover, the receiving unit 401 may be further arranged to receive multiple images, one from each of the optional cameras 202-204. The receiving unit 401 may be further arranged to perform the same optional processing as performed to the image from the camera 201. Furthermore, the receiving unit 401 may be further arranged to combine all of the images received from the cameras 201-204. For example, the receiving unit 401 may be arranged to stitch all of the images from the cameras 201-204 together into a single image for input into the determining unit 402. In this way, the determining unit 402 need only perform damage determination on a single image. Alternatively, the receiving unit 401 may, instead, output the images received from the cameras 201-204 individually into the determining unit 402. In this way, damage determination is performed on single images each received from a different camera.

Optionally, when multiple images are stitched into a single image, the receiving unit 401 may be further arranged to synchronise the images so that where a vehicle feature appears in multiple images (such as the front bumper appearing in two images) the images are appropriately combined so that the vehicle feature (e.g. the front bumper) maps across the multiple images. In this way, the resulting image only includes the vehicle feature as it appears in the real-world without unnecessary duplication caused by using multiple images as a source. For example, simply stitching two images together of the front of the vehicle 100 may result in the front bumper appearing twice in the final image. However, by synchronising the images (for example, by cropping, rotating and/or adjusting the perspective of the images) then the final image can be produced with only a single front bumper, corresponding with the vehicle in the real-world.

Optionally, the receiving unit 401 may further comprise a camera trigger unit (now shown) arranged to trigger the camera 201 and/or the plurality of cameras 201-204 to capture the images of the vehicle 100 in response to a particular condition. For example, the camera trigger unit may be arranged to only capture an image when the vehicle 100 has completely stopped in front of the camera so that motion blur of the vehicle 100 is minimised. Optionally, the camera trigger unit is implemented as a statistical method (neural network) arranged to determine whether a vehicle is present deducted from the camera input. To achieve this, the statistical method is trained on human annotated pictures gathered from the cameras.

In more detail, the camera trigger unit may be trained to find vehicle 100 in the captured image. Moreover, the camera trigger unit may further determine whether the vehicle is well positioned, such as positioned in the correct position for damage detection. To achieve this, a statistical model based on convolutional neural network—trained by hand-annotated images of well-positioned vehicles and poorly-positioned/missing vehicles may be used. Moreover, the camera trigger unit may determine whether the vehicle is stationary: A vehicle is considered stationary after a plurality of images of the vehicle are taken and the vehicle does not move between images. For example, three images of the vehicle may be taken and the vehicle may be considered to be stationary if the vehicle does not move between the first, second and third images.

The images processed by the receiving unit 401 are output to the determining unit 402 and the optional training unit 403.

The determining unit 402 is arranged to determine damage based on the image received from the receiving unit 401. This may be performed using a statistical model and/or machine-learning model arranged to find the similarity between parts of the received image and types of damage known to the determining unit 402.

The statistical model may receive a single image or a plurality of images to determine the damage on the vehicle in the image. Optionally, when an image is mis-triggered, the statistical model may indicate that no vehicle is present in the image rather than to attempt to determine damage on a vehicle not present in the image. The statistical model may take the form of a standard machine learning model, such as an artificial neural network or a Gaussian process classifier.

It is envisaged that the statistical model may be implemented as a Deep Convolutional Neural Network, such as RetinaNet.

In this way, the determining unit 402 may automatically based on an image of a vehicle identify those parts of the vehicle where damage is detected and optionally include the severity of such damage. In this regard, it is envisaged that the determining unit 402 may determine that no damage is present on the vehicle, alternatively the determining unit 402 may determine at least one area of damage on the vehicle and optionally provide a description of the type of damage (e.g. scratch, dent or missing part), severity of the damage and the like. In this way, the image from the receiving unit 401 is used to provide a breakdown of the damage present on the vehicle, to classify the damage and locate it on the vehicle. Moreover, the determining unit 402 may additionally or alternatively identify which part of the vehicle has the damage e.g. the left front door is damaged.

The optional training unit 403 is arranged to receive an image from the receiving unit 401. The image is further annotated to indicate those areas of the image which correspond with damage on the vehicle 100 shown in the image. Typically, such annotation is performed by a human operator identifying those areas of the image which are indicative of damage (whether it's denting, missing parts and/or scratching). In this way, the training unit 403 receives a plurality of images which have been annotated with damage thereby providing a number of examples of such damage.

The optional training unit 403 may be further arranged to train the determining unit 402 to determine damage based on the received annotated images.

In this way, the training unit 403 may be used initially to train the determining unit 402 to identify damage. However, once the training has been completed then the training unit 403 need not be used. In this respect, the training of the determining unit 402 may occur 'off-line' i.e. before putting the damage detection system into effect. In this way, the damage determination system may be provided fully trained by the training unit 403 so that in operation the training unit 403 need not be activated because it has fulfilled its role of training the determining unit 402.

Therefore, once the determining unit 402 has been trained by the training unit 403 then the training unit 403 is no longer required because the training has been completed. Alternatively, the training unit 403 may continue to receive annotated images to increase the number examples of damage which may be used in the training of the statistical model. Therefore, after a predetermined period of time, for example, once per week, once per month, once per year etc. the statistical model may be retrained using all of the images collected by the training unit 403. In this way, the accuracy of the statistical model may be improved over time.

The comparing unit 404 is arranged to receive the indications of damage on the vehicle as determined by the determining unit 402. The comparing unit 404 is arranged to compare the received indications of damage with those previously known to be on the vehicle and, based on the comparison, to determine whether new damage has occurred since the last time damage detection was performed on the vehicle. To achieve this, the comparing unit 404 is used in conjunction with a storing unit 405 arranged to store information about damage previously determined to be present on the vehicle.

Therefore, the comparing unit 404 is arranged to receive the determined damage as determined by the determining unit 402 and to compare it with information stored by the storing unit 405 about previous damage stored about the vehicle. When no new damage has been detected by the comparing unit 404 then it may indicate that such a determination has been reached. Alternatively, when new damage has been determined to be present, the comparing unit 404 may indicate the severity of the new damage together with its location on the vehicle. Optionally, the comparing unit 404 may determine whether such new damage requires repair or not. To achieve this, the comparing unit 404 may be arranged to compare the new damage to a predetermined threshold. When the new damage is determined to be below a predetermined threshold, then it may be classed as 'wear and tear' which is usual damage caused by operating such a vehicle. However, when the damage exceeds the predetermined threshold the damage may require immediate rectification and repair. Moreover, the comparing unit 404 may be further arranged to objectively examine each area of damage, even if it is classed as 'wear and tear' and determine that the damage requires immediate rectification and repair when the severity of the damage exceeds a predetermined threshold. In this way, damage which is continually classed as 'wear and tear' does not steady grow over time because there is only a small increase in damage between examinations by the damage detection unit 400. In this way, the current severity of the damage is assessed as well as comparing the damage to that previously stored.

The comparing unit 404 may be further arranged to update the information stored in the storing unit 405 once the comparison has been completed. In particular, the storing unit 405 may be updated by the comparing unit 404 with information about the current state of damage on the vehicle. In this way, the next time the comparing unit 404 compares the damage on a vehicle to that stored in the storing unit 405 then the comparison occurs based on the latest information about the state of damage on the vehicle. It is also envisaged that if a workshop or the like repairs the damage on the vehicle then the workshop may be arranged to update the storing unit 405 with information indicating that the damage on the vehicle has been repaired. Accordingly, the next comparison made by the comparing unit 404 makes the comparison on the basis of the vehicle having no damage.

Moreover, the storing unit 405 may further store information about the vehicle together with the damage associated therewith. For example, the number plate/license plate of the vehicle may be stored together with information about the damage on the vehicle. It is envisaged that the determining unit 402 may be further arranged to automatically determine the number plate/license plate of vehicle together with information about the damage determined on the vehicle based on an image of the vehicle 100. The storing unit 405 may therefore store the damage previously determined together with the number plate/license plate so that the vehicle may be accurately identified when performing a comparison by the comparing unit 404. Alternatively, another identifier may be used to indicate on which specific vehicle the damage detection process is being performed. For example, some vehicles use individual numbers or letter painted on the roof thereof, it is therefore envisage that a camera may capture an image of such an identifier and thereby automatically determine the identity of the vehicle.

Optionally a commanding unit 406 is provided arranged to issue commands to the directing unit 205. In this regard, the issued command may cause the directing unit to indicate that the vehicle is to be driven to a workshop. Alternatively, the issued command may cause the directing unit to indicate that the vehicle is to proceed on its normal route and not proceed to a workshop, for example, the vehicle is to proceed to be refuelled, restocked with products, attend to a next customer or the like. As described previously, the directing unit 205 may take the form of a traffic light/traffic signal/stop light. In this way, an instruction may be conveyed to the driver of the vehicle indicating how they are to proceed. Alternatively, for a vehicle which is able to self-drive then the directing unit 205 may take the form of a transmitter arranged to transmit instructions to the self-driving vehicle to directly set the destination of the vehicle and whether it is to proceed to a workshop or not.

To this end, the commanding unit 406 may be arranged to issue an instruction to bypass a workshop, refuel, restock, attend to the next customer or the like when the comparison of damage as performed by the comparing unit 404 indicates that at least one of: there is no new damage, the existent damage is below a threshold for repair and new damage is below a threshold for repair (i.e. it is classed as 'wear and tear').

However, the commanding unit 406 may be arranged to issue an instruction to proceed to workshop for repair when the comparing unit 404 indicates existent damage exceeds a threshold for repair and/or new damage is greater than a threshold for repair (i.e. new damage is severe enough to warrant immediate repair).

In this way, the damage detection unit 400 may be arranged to identify damage on a vehicle and, where necessary, instruct the vehicle to be repaired.

Figure 4:
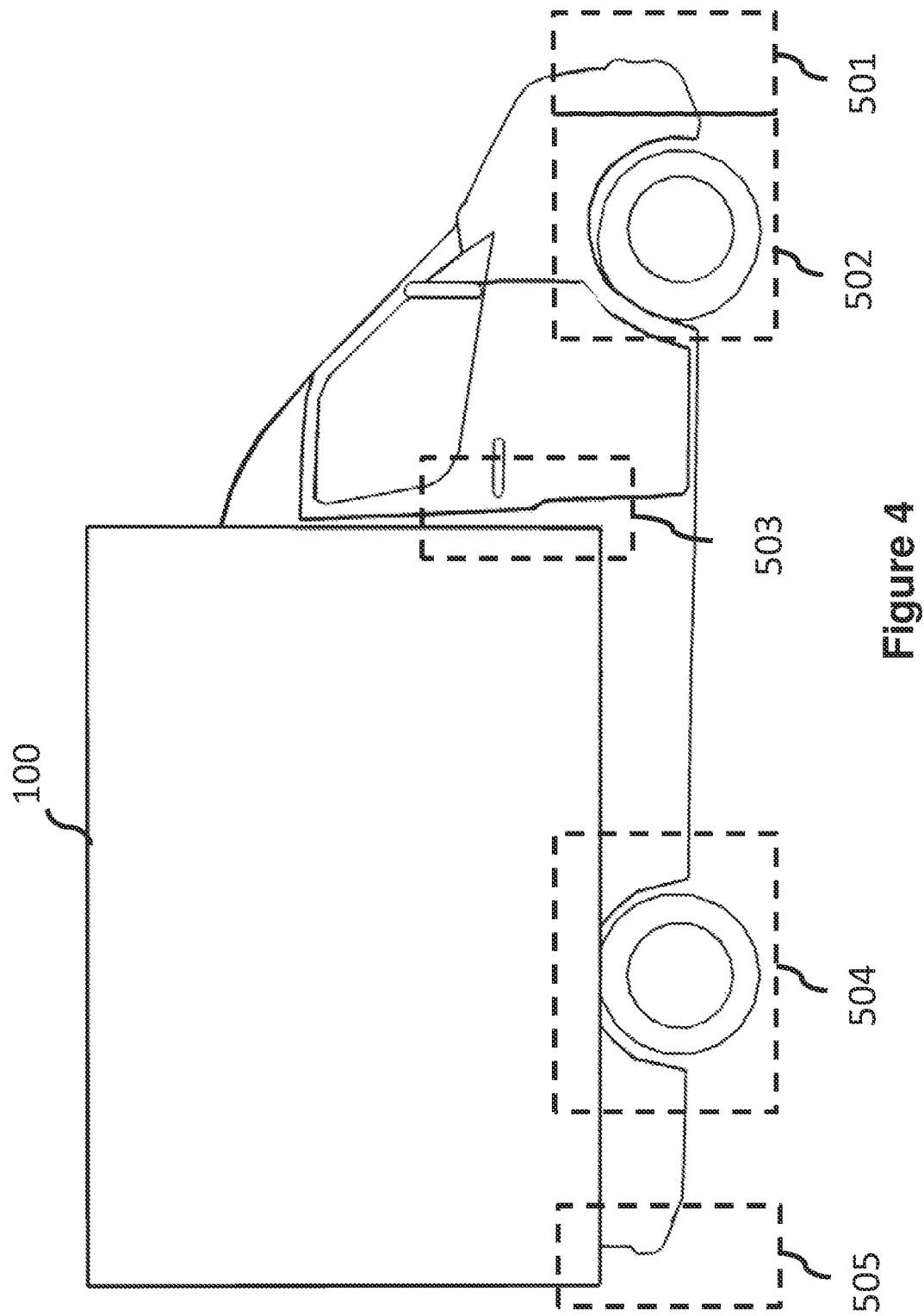
FIG. 4 depicts an image of a vehicle as captured by a camera together with areas of interest on the vehicle.

The above described determining unit 402 may be further arranged to particularly focus on damage in specific areas of the vehicle. For example, as shown in FIG. 4 the determining unit 402 may be trained to focus on damage in areas 501-505. These areas 501-505 may be selected to correspond with areas known to be sensitive to damage. For examples, areas 501 and 505 correspond with bumper areas of the vehicle 100 which are most likely to be impacted/scratched in any collision of the vehicle 100 with an obstacle. Therefore, they are the most likely to be damaged. These areas 501 and 505 also comprise headlights and turn signals, therefore damage to these areas will also likely prevent the correct operations of these devices. Moreover, wheel areas 502 and 504 are likely rubbed along a curb causing damage to the wheel arches, wheel hubs and tyres. Damage to any of these areas may in turn cause flat tyres and other tyre damage which would prevent the vehicle for handling and driving correctly.

Other areas of focus may comprise door areas 503 which are areas of high usage when loading and unloading the vehicle 100. Moreover, since doors usually swing outwards from the vehicle 100 they are likely to impact with obstacles located at the sides of the vehicle 100. Damage to these areas may prevent door opening/closing/latching correctly.

To this end, the training of the determining unit 402 may be configured to provide more training of damage occurring in the specified areas 501-505 so that the determining unit 402 is thereby more sensitive to damage in the these areas 501-505. Additionally or alternatively, the determining unit 402 may be arranged to determine damage in the specific areas 501-505. For example, the determining unit 402 may be further arranged to identify the specific areas 501-505 on the image of the vehicle and then in turn determine the damage in these areas and not to determine damage in any other part of the vehicle 100. In other words, the determining unit 402 may be arranged to detect specific features of the vehicle 100 (such as, left door, front bumper etc.). Moreover, the determining unit 402 may further determine damage in/on the specific feature of the vehicle 100. In this way, those areas of the vehicle 100 likely to be most heavily damaged have damage determined therefrom. Additionally or alternatively, once the specific areas 501-505 have been searched for damage and no damage is found, the determining unit 402 may be then further arranged to search for damage in other locations of the vehicle 100.

Moreover, by determining damage in specific areas 501-505 damage may be localised to a particular part thereby enabling the production of detailed reporting and specific repair. For example, focus on the front bumper of a vehicle and the damage it contains may provide the option of either repairing each individual point of damage or more simply replacing the front bumper as a whole. In this way, simpler repair is facilitated by the focus of the damage detection to specific vehicle features such as light, bumpers, doors and the like.

Figure 5:
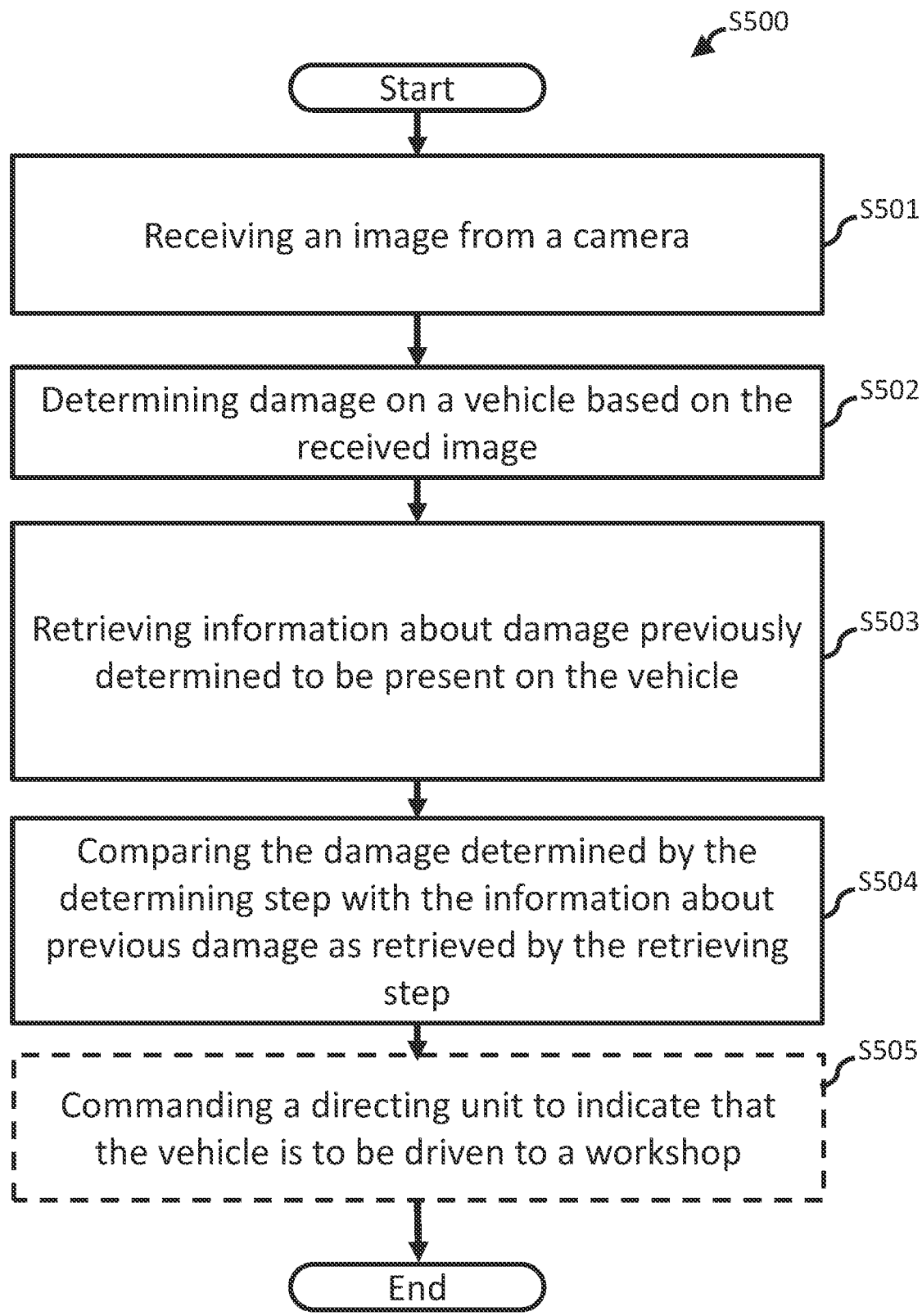
FIG. 5 depicts a method of detecting damage on a vehicle according to a first embodiment of the present invention.

FIG. 5 shows the processes performed by a damage detection system according to the first embodiment of the present invention. In particular, the flowchart S500 shows the calculation of damage on a vehicle based on an image of the vehicle and information about damage previously detected on the vehicle.

At step S501, a receiving unit receives an image of the vehicle from a camera. In this regard, only one camera need be used to detect damage on the vehicle. However, it may be advantageous to use multiple images of the vehicle taken from different angles and under varying lighting conditions to fully detect all of the damage present. Moreover, HDR images may be used to further improve the contrast of damaged areas of the vehicle. The receiving step S501 may further process the received images to account for differing light conditions and objects in the frame of the image but not of the vehicle such as ground, sky, people who may be situated behind the vehicle. To this end, the receiving step S501 may crop such extraneous objects from the image of the vehicle so that further steps performed by the flowchart S500 are not confused by the extraneous objects and/or are provided with uniform images which do not vary across vehicles apart from the vehicle itself.

At step S502, damage is determined to be on a vehicle based on the image received from step S501. To achieve this, a machine learning model and/or a statistical model may be used to identify features of damage in the image of the vehicle. More specifically, the machine learning model and/or statistical model may be trained on annotated images which have annotated by humans to identify areas of damage. Based on the annotated images the model may be used to predict, based on the experience learn from annotated images, areas of damage on the vehicle without the need for a human to further annotate any images. The model may be trained prior to being put to use as a damage detection system (i.e. training may occur during manufacture) so that initially no training step need be performed. Moreover, further annotated images may be gathered over time and used to further improve the accuracy of the detection of damage in the received image.

The determining step S502 may be further arranged to determine an identifier of the vehicle from the received image. For example, the image may comprise the license plate of the vehicle which is unique to each vehicle. In this way, the damage detected can be associated to a specific vehicle.

At step S503, a retrieving step stores information about damage previously determined to be present on the vehicle from a storing unit. In this regard, previous uses of the damage detection system may have previously determined damage to be present on the vehicle. Therefore, the retrieving step S503 retrieves the determined damage. In one example, the determined damage is determined with an identifier of the vehicle so that the damage present on a specific vehicle can be recalled by looking it up based on the vehicle identifier. Moreover, when the damage on a vehicle is repaired or when a new vehicle is brought into service, the storing unit may store information that the vehicle has no damage (because the damage has been fixed or is a new vehicle). Therefore, future uses of the damage detection system are run with a vehicle which has no damage present when the retrieving step S503 retrieves information from the storing unit.

At step S504, damage is compared based on that determined in the determining step S502 and the retrieving step S503. More specifically, the comparing step S504 receives from the determining step S502 the damaged determined on the present vehicle at the present time based on the received image. Moreover, the comparing step S504 receives damage previously identified on the present vehicle at a previous time and which has been retrieved by the retrieving step S503. The comparing step S504 thereby compares the damage information to determine whether any new damage has occurred between the last time damage detection was performed for the vehicle and the present instance. When no new damage has been determined the comparing step may output that no new damage has been determined.

However, when new damage is determined the comparing step S504 may indicate where the new damage has occurred and how severe the damage is. When the severity of the damage is below a particular threshold then the damage may be classified as 'wear and tear' and no further action may be required. When the damage is above or equal to the particular threshold then the damage may require immediate repair because it may cause a hazard to the operation of the vehicle (such as lights not working, flat tyre and the like), therefore immediate action may be taken.

Furthermore, specific areas of the vehicle may have different thresholds of damage before which action must be taken. For action, the hazard caused by a damaged tyre may be higher than a damaged light. Therefore, when the severity of damage on a tyre is lower than that of damage to a light but above the threshold specific for a tyre, then the tyre may require immediate repair whilst repair of the light (when damage to the light is not above the threshold specific for a light) may be postponed/not performed. In other words, different thresholds may be applied to different parts of the vehicle to decide when repair is required and when damage is classified as 'wear and tear'.

The flowchart S500 may further comprise the optional step of commanding S505 a directing unit to direct the vehicle to the workshop based on the comparing step S504. In other words, based on the result of the comparison performed by the comparing step S504, the method S500 may further command a directing unit to direct the vehicle to a workshop for repair. In one example, the directing unit takes the form of traffic signals with arrows to indicate the direction of travel of the vehicle. When no new damage is determined or the damage is determined to be 'wear and tear' or the damage is below a predetermined threshold then the commanding step S505 may command the directing unit to indicate the vehicle to proceed to a location for loading/unloading/cleaning. However, when damage is determined to be greater than a predetermined threshold by the comparing step S504 then the commanding step S505 may command the directing unit to direct the vehicle to a workshop for immediate repair of the damage.

Modifications and Variations

Many modifications and variations can be made to the embodiments described above, without departing from the scope of the present invention.

Although the above has been described with regard to repair of the vehicle, other factors may be considered to be preventative to avoid the cause of the damage in the first place. For example, when a delivery/pick-up vehicle follows a specific route then the choice of route may be correlated to damage inflicted to the vehicle along the route. In this way, when a number of vehicles proceed along the same route and/or portion of the route and incur similar damage at similar locations of the vehicle then the route/portion of the route may be marked as dangerous. In this way, route determination may take into account the damage typically inflicted along the route and choose a different route, mark the route as dangerous and/or encourage drivers to be especially cautious along the route. In this way, the cause of the damage can be eliminated.

In this regard, the delivery/pick-up company may record which vehicle has been assigned to which route along with the driver to be used for the route. All of this information may be stored in the storing unit 405 previously described so that it is available to means for route determination.

Similarly, where drivers are assigned to drive specific vehicles then monitoring the damage inflicted on a vehicle may be linked to a specific driver. In this way, particularly dangerous or inattentive drivers may be identified and re-trained to encourage better driving. In the case of a vehicle hire company such information may be used to determine whether the company would best avoid hiring a vehicle to such an individual. In this way, the vehicle damage which would be expected from such as a driver may be avoided.

With respect to computer-implemented embodiments, the description provided may describe how one would modify a computer to implement the system or steps of a method. The specific problem being solved may be in the context of a computer-related problem, and the system may not be meant to be performed solely through manual means or as a series of manual steps. Computer-related implementation and/or solutions may be advantageous in the context of some embodiments; at least for the reasons of providing scalability (the use of a single platform/system to manage a large number of inputs and/or activities); the ability to pull together quickly and effectively information from disparate networks; improved decision support and/or analytics that would otherwise be unfeasible; the ability to integrate with external systems whose only connection points are computer-implemented interfaces; the ability to achieve cost savings through automation; the ability to dynamically respond and consider updates in various contexts (such as quickly changing order flow or logistical conditions); the ability to apply complex logical rules that would be infeasible through manual means; the ability for orders to be truly anonymous; among others.

Using electronic and/or computerised means can provide a platform that may be more convenient, scalable, efficient, accurate, and/or reliable than traditional, non-computerised means. Further, systems may be computerised and the platform may advantageously be designed for interoperability, and manual operation may be difficult and/or impossible. Further, manual operation, even if feasible, is unlikely to achieve comparable efficiency and/or Scalability may be useful as it may be advantageous to provide a system that may be able to effectively manage a large number of inputs, outputs and/or interconnections and/or integration with external systems.

The convenience and effectiveness of a solution may be valuable in the context of order fulfilment as individuals may have more information available to make better ordering and/or fulfilment decisions.

Figure 6:
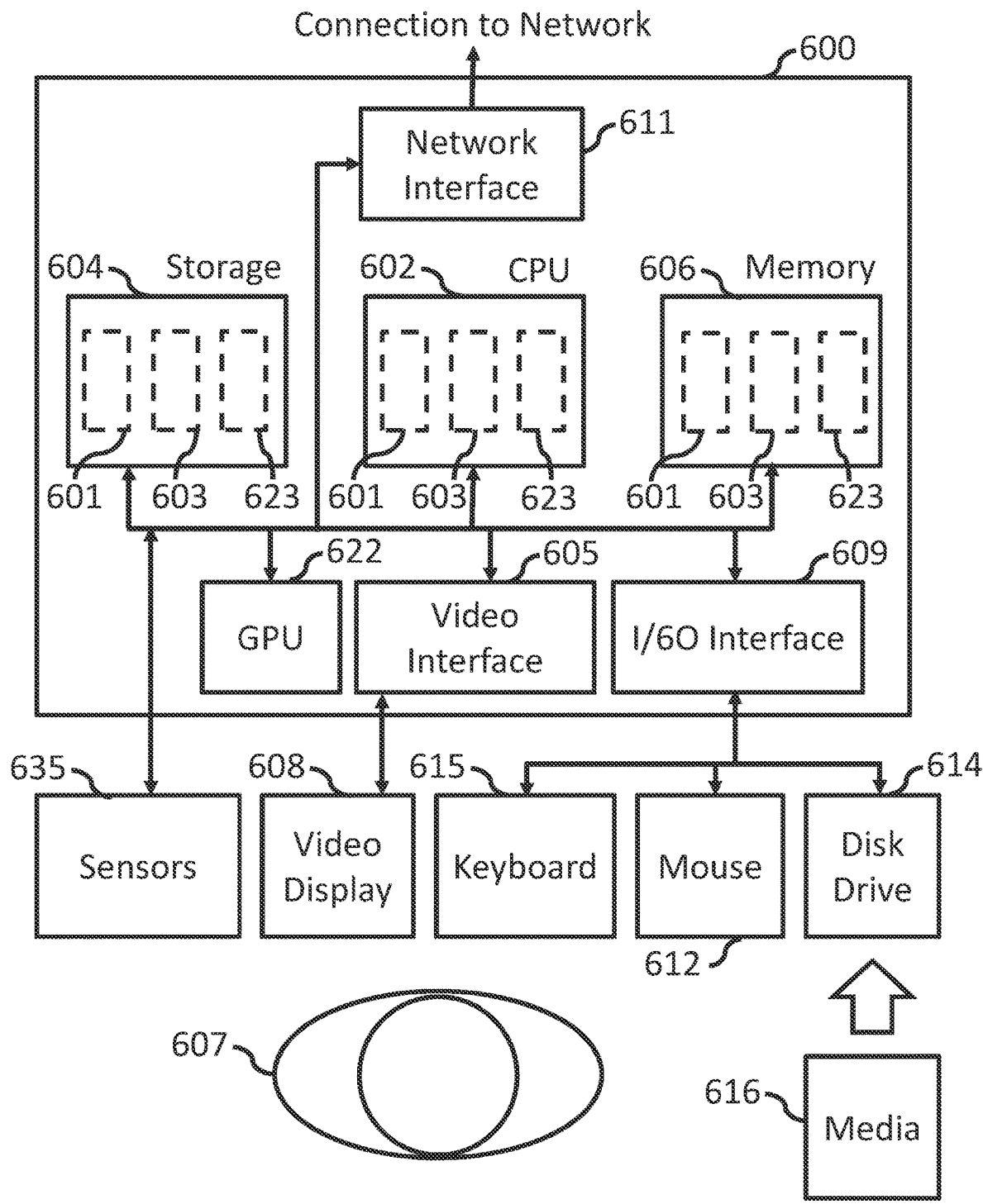
FIG. 6 depicts an illustrative diagram providing a generic computer hardware and software implementation of certain aspects, as detailed in the description.

The present system and method may be practiced in various embodiments. A suitably configured computer device, and associated communications networks, devices, software and firmware may provide a platform for enabling one or more embodiments as described above. By way of example, FIG. 6 shows a computer device 600 that may include a central processing unit ("CPU") 602 connected to a storage unit 604 and to a random access memory 606. The CPU 602 may process an operating system 601, application program 603, and data 623. The operating system 601, application program 603, and data 623 may be stored in storage unit 604 and loaded into memory 606, as may be required. Computer device 600 may further include a graphics processing unit (GPU) 622 which is operatively connected to CPU 602 and to memory 606 to offload intensive image processing calculations from CPU 602 and run these calculations in parallel with CPU 602. An operator 607 may interact with the computer device 600 using a video display 608 connected by a video interface 605, and various input/output devices such as a keyboard 615, mouse 612, and disk drive or solid state drive 614 connected by an I/O interface 609. In known manner, the mouse 612 may be configured to control movement of a cursor in the video display 608, and to operate various graphical user interface (GUI) controls appearing in the video display 608 with a mouse button. The disk drive or solid state drive 614 may be configured to accept computer readable media 616. The computer device 600 may form part of a network via a network interface 611, allowing the computer device 600 to communicate with other suitably configured data processing systems (not shown). One or more different types of sensors 635 may be used to receive input from various sources.

The present system and method may be practiced on virtually any manner of computer device including a desktop computer, laptop computer, tablet computer or wireless handheld. The present system and method may also be implemented as a computer-readable/useable medium that includes computer program code to enable one or more computer devices to implement each of the various process steps in a method in accordance with the present invention. In case of more than computer devices performing the entire operation, the computer devices are networked to distribute the various steps of the operation. It is understood that the terms computer-readable medium or computer useable medium comprises one or more of any type of physical embodiment of the program code. In particular, the computer-readable/useable medium can comprise program code embodied on one or more portable storage articles of manufacture (e.g. an optical disc, a magnetic disk, a tape, etc.), on one or more data storage portioned of a computing device, such as memory associated with a computer and/or a storage system.

The mobile application of the present invention may be implemented as a web service, where the mobile device includes a link for accessing the web service, rather than a native application. The functionality described may be implemented to any mobile platform, including the Android platform, iOS platform, Linux platform or Windows platform.

In further aspects, the disclosure provides systems, devices, methods, and computer programming products, including non-transient machine-readable instruction sets, for use in implementing such methods and enabling the functionality described previously.

The foregoing description of embodiments of the invention has been presented for the purpose of illustration and description. It is not intended to be exhaustive or to limit the invention to the precise form disclosed. Modifications and variations can be made without departing from the spirit and scope of the present invention.

The invention claimed is:

1. A damage detection unit configured and arranged to detect damage on a vehicle, the damage detection unit comprising:
 a receiving unit configured and arranged to receive an image from a camera;
 a determining unit configured and arranged to use at least one of a machine learning model or a statistical model to determine damage on the vehicle based on the received image, the at least one of the machine learning model or the statistical model having been trained on annotated images which have been annotated to indicate areas of damage on the vehicle;
a storing unit configured and arranged to store information about damage previously determined to be present on the vehicle;
a comparing unit configured and arranged to compare the damage determined by the determining unit with the information about previous damage as stored by the storing unit; and
a commanding unit configured and arranged to issue one or more commands to a directing unit,
wherein the determining unit is configured and arranged to identify one or more specific component parts of the vehicle where the damage is determined and the comparing unit is configured and arranged to compare the damage to one or more damage thresholds corresponding to the one or more specific component parts of the vehicle where the damage is determined,
wherein the one or more commands are determined based on the damage having a predetermined relationship with the one or more damage thresholds, and
wherein the directing unit is configured and arranged to output one or more signals based on the one or more commands.

2. The damage detection unit according to claim 1, wherein the comparing unit is configured and arranged to determine whether new damage has been created based on compared damage provided by the comparing unit.

3. The damage detection unit according to claim 2, the damage detection unit comprising:
a training unit configured and arranged to receive images from the receiving unit which have been annotated to indicate areas of damage on the vehicle, and configured and arranged to train the determining unit to determine damage based on the annotated images.

4. The damage detection unit according to claim 3, the damage detection unit comprising:
a camera trigger unit having a machine learning model configured and arranged to cause the camera to capture an image of the vehicle.

5. A damage detection system, the system comprising in combination:
a camera configured and arranged to capture an image of a vehicle; and
a damage detection unit according to claim 4.

6. The damage detection system according to claim 5, the system comprising:
a directing unit configured and arranged to indicate to the vehicle at least one of:
the vehicle is to proceed to a workshop;
the vehicle is to avoid the workshop; and
the vehicle should proceed, at a future time, to the workshop.

7. The damage detection unit according to claim 1, the damage detection unit comprising:
a training unit configured and arranged to receive images from the receiving unit which have been annotated to indicate areas of damage on the vehicle, and configured and arranged to train the determining unit to determine damage based on the annotated images.

8. The damage detection unit according to claim 1, wherein the one or more signals based on the one or more commands indicate at least one of:
the vehicle is to proceed to a workshop;
the vehicle is to avoid the workshop; and
the vehicle should proceed, at a future time, to the workshop.

9. A damage detection system, the system comprising in combination:
a camera configured and arranged to capture an image of a vehicle; and
a damage detection unit according to claim 8.

10. The damage detection system according to claim 9, the system comprising:
the directing unit configured and arranged to output the one or more signals to indicate to the vehicle.

11. The damage detection unit according to claim 1, the damage detection unit comprising:
a camera trigger unit having a machine learning model configured and arranged to cause the camera to capture an image of the vehicle.

12. A damage detection system, the system comprising in combination:
a camera configured and arranged to capture an image of a vehicle; and
a damage detection unit according to claim 1.

13. The damage detection system according to claim 12, the system comprising:
a directing unit configured and arranged to indicate to the vehicle at least one of:
the vehicle is to proceed to a workshop;
the vehicle is to avoid the workshop; and
the vehicle should proceed, at a future time, to the workshop.

14. The damage detection unit according to claim 1, wherein the directing unit comprises at least one of a traffic light, a traffic signal, or a stop light.

15. The damage detection unit according to claim 1, wherein the directing unit comprises a transmitter arranged to transmit the one or more signals as instructions to the vehicle.

16. A damage detection method for detecting damage on a vehicle, the method comprising:
receiving an image from a camera;
determining damage on the vehicle based on the received image using at least one of a machine learning model or a statistical model trained on annotated images which have been annotated to indicate areas of damage on the vehicle;
retrieving information about damage previously determined to be present on the vehicle;
comparing the damage determined by the determining with the information about previous damage as retrieved by the retrieving;
identifying one or more specific component parts of the vehicle where the damage is determined;
comparing the damage to one or more damage thresholds corresponding to the one or more specific component parts of the vehicle where the damage is determined;
issuing one or more commands to a directing unit;
determining the one or more commands based on the damage having a predetermined relationship with the one or more damage thresholds; and
outputting one or more signals based on the one or more commands.

17. The damage detection method according to claim 16, wherein the method comprises:
determining whether new damage has been created based on compared damage of the comparing.

18. The damage detection method according to claim 17, the method comprising:

receiving images which have been annotated to indicate areas of damage on the vehicle; and training to determine damage based on the annotated images.

19. The damage detection method according to claim 16, the method comprising:

receiving images which have been annotated to indicate areas of damage on the vehicle; and training to determine damage based on the annotated images.

20. The damage detection method according to claim 16, wherein the one or more signals indicate at least one of:

the vehicle is to proceed to a workshop;

the vehicle is to avoid the workshop; and the vehicle should proceed, at a future time, to the workshop.

* * * * *